United States Patent
Shimazawa et al.

(10) Patent No.: US 7,333,303 B2
(45) Date of Patent: Feb. 19, 2008

(54) MAGNETORESISTIVE DEVICE SUPPLYING SENSE CURRENT THERETO DEPENDENT UPON A RELATIONSHIP EXISTENT BETWEEN THE THICKNESS OF THE FIXED LAYER AND ITS MAGNETIZATION

(75) Inventors: Koji Shimazawa, Tokyo (JP); Yoshihiro Tsuchiya, Tokyo (JP); Kenji Inage, Tokyo (JP)

(73) Assignee: TDK Corporation, Tokyo (JP)

( * ) Notice: Subject to any disclaimer, the term of this patent is extended or adjusted under 35 U.S.C. 154(b) by 398 days.

(21) Appl. No.: 11/023,505

(22) Filed: Dec. 29, 2004

(65) Prior Publication Data

US 2006/0028773 A1 Feb. 9, 2006

(30) Foreign Application Priority Data

Aug. 4, 2004 (JP) ............... 2004-227582

(51) Int. Cl.
*G11B 5/39* (2006.01)
(52) U.S. Cl. ............................... 360/324.11
(58) Field of Classification Search ......... 360/324.11; 428/811.3
See application file for complete search history.

(56) References Cited

U.S. PATENT DOCUMENTS

| | | | |
|---|---|---|---|
| 5,738,946 A | 4/1998 | Iwasaki et al. | |
| 6,338,899 B1 | 1/2002 | Fukuzawa et al. | |
| 6,500,570 B2 | 12/2002 | Hasegawa et al. | |
| 6,767,655 B2* | 7/2004 | Hiramoto et al. | 428/811.2 |
| 7,029,770 B2* | 4/2006 | Shimazawa et al. | 428/811.5 |
| 2001/0018135 A1 | 8/2001 | Hasegawa et al. | |
| 2002/0048690 A1 | 4/2002 | Fukuzawa et al. | |
| 2004/0121185 A1 | 6/2004 | Fukuzawa et al. | |

FOREIGN PATENT DOCUMENTS

| | | |
|---|---|---|
| JP | A 09-082524 | 3/1997 |
| JP | A 09-148132 | 6/1997 |
| JP | A 2000-137906 | 5/2000 |
| JP | A-2001-168416 | 6/2001 |
| JP | A 2002-043655 | 2/2002 |

* cited by examiner

*Primary Examiner*—A. J. Heinz
(74) *Attorney, Agent, or Firm*—Oliff & Berridge (57) ABSTRACT

Provided is a magnetoresistive device capable of stably maintaining sufficient output characteristics even under a higher temperature environment while responding to a demand for a higher recording density. The magnetoresistive device comprises an MR film including a fixing layer made of IrMn, an outer pinned layer of which the magnetization direction is fixed in a +Y direction by the fixing layer, and an inner pinned layer of which the magnetization direction is fixed in a −Y direction by the fixing layer, a pair of conductive lead layers and a constant current circuit which flows a sense current in a +X direction so as to generate a current magnetic field toward a −Y direction in the inner pinned layer, and in the magnetoresistive device, a conditional expression (1) is satisfied. Thereby, the magnetization directions of the outer pinned layer and the inner pinned layer can be stabilized, so even under a high temperature environment, the magnetoresistive device can obtain stable output characteristics, and can respond to a demand for a higher recording density.

16 Claims, 5 Drawing Sheets

MAGNETORESISTIVE DEVICE SUPPLYING SENSE CURRENT THERETO DEPENDENT UPON A RELATIONSHIP EXISTENT BETWEEN THE THICKNESS OF THE FIXED LAYER AND ITS MAGNETIZATION

BACKGROUND OF THE INVENTION

1. Field of the Invention

The present invention relates to a thin film magnetic head, a head gimbal assembly, a head arm assembly and a magnetic disk drive comprising a magnetoresistive device which includes a fixing layer made of an iridium-manganese alloy (IrMn), and a method of driving such a magnetoresistive device.

2. Description of the Related Art

Conventionally, magnetic disk drives are used as devices recording and reading magnetic information (hereinafter simply referred to as information). The magnetic disk drive comprises, for example, a magnetic disk in which information is stored and a thin film magnetic head which records information onto the magnetic disk and reproduces information recorded on the magnetic disk in an enclosure. The thin film magnetic head comprises a recording head including an air bearing surface (ABS) which faces the magnetic disk and a reproducing head. The reproducing head includes a giant magnetoresistive device (GMR device) exhibiting a giant magnetoresistive (GMR) effect. In particular, a spin-valve (SV) type GMR device is generally used.

The SV type GMR device (SV-GMR device) comprises a SV film with a structure in which a magnetic layer (magnetization fixed layer) of which the magnetization direction is fixed in a predetermined direction and a magnetic layer (magnetization free layer) of which the magnetization direction changes depending upon a signal magnetic field from the magnetic disk are laminated with a non-magnetic intermediate layer in between, and in the SV-GMR device, at the time of reproducing, a sense current flows into an in-plane direction of a laminate. Such a GMR device is specifically called a CIP (Current in Plane)-GMR device. In this case, when a sense current flows depending upon a relative angle between the magnetization directions of two magnetic layers (the magnetization fixed layer and the magnetization free layer) in the SV film, electrical resistance (that is, voltage) changes. The magnetization fixed layer is disposed adjacent to a fixing layer made of an antiferromagnetic material. The fixing layer is exchange coupled to the magnetization fixed layer through producing an exchange coupling force between the fixing layer and the magnetization fixed layer. The characteristics or reliability of the SV-GMR device depends upon the magnitude of the exchange coupling force or thermostability, so in order to improve the exchange coupling force and heat resistance, an antiferromagnetic layer using a nickel-manganese alloy (NiMn) or a platinum-manganese alloy (PtMn) has been widely adopted.

Moreover, a SV-GMR device in which a magnetization fixed layer has a three-layer synthetic structure including two ferromagnetic layers (a first ferromagnetic layer and a second ferromagnetic layer) and a non-magnetic intermediate layer disposed between the ferromagnetic layers to produce a strong exchange coupling force between the first and the second ferromagnetic layers, thereby an exchange coupling force with the antiferromagnetic layer is effectively increased has been proposed (for example, refer to Japanese Unexamined Patent Application Publication No. 2000-137906). Further, a SV-GMR device in which a matching layer is inserted between an antiferromagnetic layer and a magnetization fixed layer to increase an exchange coupling force has been disclosed (for example, refer to Japanese Unexamined Patent Application Publication No. Hei 9-82524).

In recent years, a reduction in the profile of a thin film magnetic head (the width of a gap) has been strongly required according to an increase in the recording density (capacity) of a magnetic disk. However, in the case where an ordered alloy (a material requiring a regular atomic arrangement to develop an antiferromagnetic property) such as NiMn or PtMn which is described above is used for an antiferromagnetic layer, in order to secure a sufficient exchange coupling force, the antiferromagnetic layer made of the ordered alloy is required to have a thickness of approximately 10 nm, so the thin film magnetic head cannot sufficiently respond to a demand for a reduction in the profile. Moreover, the thickness of the antiferromagnetic layer forms a relatively high proportion of the total thickness of the SV-GMR device, so when the thicknesses of layers except for the antiferromagnetic layer are reduced to reduce the total thickness of the SV-GMR device, the ratio of a sense current flowing through the antiferromagnetic layer is relatively large, thereby it results in a decline in output as a reproducing head.

On the other hand, a SV-GMR device in which an iridium-manganese alloy (IrMn) is used for an antiferromagnetic layer has been disclosed (for example, refer to Japanese Unexamined Patent Application Publication No. Hei 9-148132). The antiferromagnetic layer using IrMn can obtain a sufficient exchange coupling force with a magnetization fixed layer, even if the antiferromagnetic layer has a thickness of less than 10 nm, and as a result, a decline in output as a reproducing head can be prevented.

However, even in the SV-GMR device in Japanese Unexamined Patent Application Publication No. Hei 9-148132, when the antiferromagnetic layer has a thickness of less than 10 nm, its heat resistance is not sufficient. For example, in a high temperature environment of 200° C. or more, an exchange coupling force between the antiferromagnetic layer and the magnetization fixed layer may be reduced.

SUMMARY OF THE INVENTION

In view of the foregoing, it is a first object of the invention to provide a magnetoresistive device capable of stably maintaining sufficient output characteristics even under a higher temperature environment while responding to a demand for a higher recording density, and a thin film magnetic head, a head gimbal assembly, a head arm assembly and a magnetic disk drive each of which comprises the magnetoresistive device. It is a second object of the invention to provide a method of driving the above magnetoresistive device.

A first magnetoresistive device according to the invention comprises: a magnetoresistive film, a pair of conductive lead layers extending so as to be disposed adjacent to at least parts of both end surfaces of the magnetoresistive film and to face each other; and a current supply means for flowing a sense current in a direction where a current magnetic field toward the second direction is generated in the second ferromagnetic layer in an in-plane direction of the laminate of the magnetoresistive film through the pair of conductive lead layers, wherein the following conditional expression (1) is satisfied.

$$0.6 \text{ mA} \leq (Ms2 \times T2 - Ms1 \times T1) \leq 1.5 \text{ mA} \tag{1}$$

In the conditional expression (1), Ms1 is the saturation magnetization of the first ferromagnetic layer (A/m); T1 is the thickness of the first ferromagnetic layer (m); Ms2 is the saturation magnetization of the second ferromagnetic layer (A/m); and T2 is the thickness of the second ferromagnetic layer (m). In this case, the magnetoresistive film includes a fixing layer including an iridium-manganese alloy (IrMn); a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer; a non-magnetic layer disposed on a side of the magnetization fixed layer opposite to a side where the fixing layer is disposed; and a magnetization free layer disposed on a side of the non-magnetic layer opposite to a side where the magnetization fixed layer is disposed and changing its magnetization direction according to an external magnetic field. Moreover, a first thin film magnetic head according to the invention comprises the above magnetoresistive device, and a first head gimbal assembly according to the invention comprises a magnetic head slider including such a thin film magnetic head on a side of the magnetic head slider; and a suspension to which the magnetic head slider is attached at an end thereof. Further, a first head arm assembly according to the invention comprises the above head gimbal assembly and an arm supporting the other end of the above suspension. Still further, a first magnetic disk drive according to the invention comprises a magnetic recording medium and the above head arm assembly.

A second magnetoresistive device according to the invention comprises: a magnetoresistive film; a pair of conductive lead layers extending so as to be disposed adjacent to at least parts of both end surfaces of the magnetoresistive film and to face each other; and a current supply means for flowing a sense current in a direction where a current magnetic field toward the first direction is generated in the first ferromagnetic layer in an in-plane direction of the laminate of the magnetoresistive film through the pair of conductive lead layers, wherein the following conditional expression (2) is satisfied.

$$-1.5 \text{ mA} \leq (Ms2 \times T2 - Ms1 \times T1) \leq 0.38 \text{ mA} \quad (2)$$

In this case, the magnetoresistive film includes a fixing layer including an iridium-manganese alloy (IrMn); a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer; a non-magnetic layer disposed on a side of the magnetization fixed layer opposite to a side where the fixing layer is disposed; and a magnetization free layer disposed on a side of the non-magnetic layer opposite to a side where the magnetization fixed layer is disposed and changing its magnetization direction according to an external magnetic field. Moreover, a second thin film magnetic head according to the invention comprises the above magnetoresistive device, and a second head gimbal assembly according to the invention comprises a magnetic head slider including such a thin film magnetic head on a side of the magnetic head slider; and a suspension to which the magnetic head slider is attached at an end thereof. Further, a second head arm assembly according to the invention comprises the above head gimbal assembly and an arm supporting the other end of the suspension. Still further, a second magnetic disk drive according to the invention comprises a magnetic recording medium and the above head arm assembly.

In the first and the second magnetoresistive devices, the first and the second thin film magnetic heads, the first and the second head gimbal assemblies, the first and the second head arm assemblies and the first and the second magnetic disk drives, the magnetoresistive film has the above structure, so when a sense current flows in the above predetermined direction, the magnetization direction of the first ferromagnetic layer and the magnetization direction of the second ferromagnetic layer are stabilized without reversing, and a exchange coupling force between the magnetization fixed layer and an antiferromagnetic layer is increased. Specifically, in the second magnetoresistive device, the second thin film magnetic head, the second head gimbal assembly, the second head arm assembly and the second magnetic disk drive, the following conditional expression (3) is preferably satisfied.

$$0 \text{ mA} < (Ms2 \times T2 - Ms1 \times T1) \leq 0.38 \text{ mA} \quad (3)$$

A method of driving a magnetoresistive device according to the invention is a method of driving a magnetoresistive device comprising: a fixing layer including an iridium-manganese alloy (IrMn); a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer; a non-magnetic layer disposed on a side of the magnetization fixed layer opposite to a side where the fixing layer is disposed; and a magnetization free layer disposed on a side of the non-magnetic layer opposite to a side where the magnetization fixed layer is disposed and changing its magnetization direction according to an external magnetic field. In the case where the following conditional expression (1) is satisfied, a sense current flows in a direction where a current magnetic field toward the second direction is generated in the second ferromagnetic layer in an in-plane direction of the laminate of the magnetoresistive device, and in the case where the following conditional expression (2) is satisfied, a sense current flows in a direction where a current magnetic field toward the first direction is generated in the first ferromagnetic layer in an in-plane direction of the laminate of the magnetoresistive device.

$$0.6 \text{ mA} \leq (Ms2 \times T2 - Ms1 \times T1) \leq 1.5 \text{ mA} \quad (1)$$

$$-1.5 \text{ mA} \leq (Ms2 \times T2 - Ms1 \times T1) \leq 0.38 \text{ mA} \quad (2)$$

In the method of driving a magnetoresistive device according to the invention, as shown in the above conditional expressions (1) and (2), depending upon a difference between the product of the saturation magnetization and the thickness of the first ferromagnetic layer and the product of the saturation magnetization and the thickness of the second ferromagnetic layer, the direction where a sense current flows is appropriately selected, so the magnetization direction of the first ferromagnetic layer and the magnetization direction of the second ferromagnetic layer are stabilized without reversing, and an exchange coupling force between the magnetization fixed layer and a antiferromagnetic layer is increased.

The first magnetoresistive device, the first thin film magnetic head, the first head gimbal assembly, the first head arm assembly and the first magnetic disk drive according to the invention comprises a magnetoresistive film including: a fixing layer including IrMn; a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer; a non-magnetic layer disposed on a side of the magnetization fixed layer opposite to a side where the fixing layer is disposed; and a magnetization free layer disposed on a side of the non-magnetic layer opposite to a side where the magnetization fixed layer is disposed and changing its magnetization direction according to an external magnetic field; a pair of conductive lead layers extending so as to be disposed adjacent to at least parts of both end surfaces of the magnetoresistive film and to face each other; and a current supply means for flowing a sense current in a direction where a current magnetic field toward the second direction is generated in the second ferromagnetic layer in an in-plane direction of the laminate of the magnetoresistive film through the pair of conductive lead layers, wherein a predetermined conditional expression (1) is satisfied, so even under a higher temperature environment, the first magnetization direction and the second magnetization direction can be stabilized, and an exchange coupling force between the magnetization fixed layer and the fixing layer can be increased. Therefore, sufficient output characteristics can be stably maintained even under a high temperature environment while responding to a demand for a higher recording density through reducing the thickness of the magnetoresistive film.

The second magnetoresistive device, the second thin film magnetic head, the second head gimbal assembly, the second head arm assembly and the second magnetic disk drive according to the invention comprises a magnetoresistive film including: a fixing layer including IrMn; a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer; a non-magnetic layer disposed on a side of the magnetization fixed layer opposite to a side where the fixing layer is disposed; and a magnetization free layer disposed on a side of the non-magnetic layer opposite to a side where the magnetization fixed layer is disposed and changing its magnetization direction according to an external magnetic field; a pair of conductive lead layers extending so as to be disposed adjacent to at least parts of both end surfaces of the magnetoresistive film and to face each other; and a current supply means for flowing a sense current in a direction where a current magnetic field toward the first direction is generated in the first ferromagnetic layer in an in-plane direction of the laminate of the magnetoresistive film through the pair of conductive lead layers, wherein a predetermined conditional expression (2) is satisfied, so even under a higher temperature environment, the first magnetization direction and the second magnetization direction can be stabilized, and an exchange coupling force between the magnetization fixed layer and the fixing layer can be increased. Therefore, sufficient output characteristics can be stably maintained even under a high temperature environment while responding to a demand for a higher recording density through reducing the thickness of the magnetoresistive film. Specifically, when a predetermined conditional expression (3) is satisfied, a balance between the magnetic moments of the first ferromagnetic layer and the second ferromagnetic layer becomes better, so a leakage magnetic field from the magnetization fixed layer can be reduced.

In the method of driving a magnetoresistive device according to the invention, in the case of driving a magnetoresistive device comprising a fixing layer including IrMn; a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer; a non-magnetic layer disposed on a side of the magnetization fixed layer opposite to a side where the fixing layer is disposed; and a magnetization free layer disposed on a side of the non-magnetic layer opposite to a side where the magnetization fixed layer is disposed and changing its magnetization direction according to an external magnetic field; when a predetermined conditional expression (1) is satisfied, a sense current flows in a direction where a current magnetic field toward the second direction is generated in the second ferromagnetic layer in an in-plane direction of the laminate of the magnetoresistive device, and when a predetermined conditional expression (2) is satisfied, a sense current flows in a direction where a current magnetic field toward the first direction is generated in the first ferromagnetic layer in an in-plane direction of the laminate of the magnetoresistive device, so an exchange coupling force between the magnetization fixed layer and the fixing layer can be increased even under a higher temperature environment, and a sufficiently stable output can be obtained.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

At first, referring to FIGS. 1 through 3, the structure of a thin film magnetic head comprising a magnetoresistive device according to a first embodiment of the invention will be described below.

Figure 1:
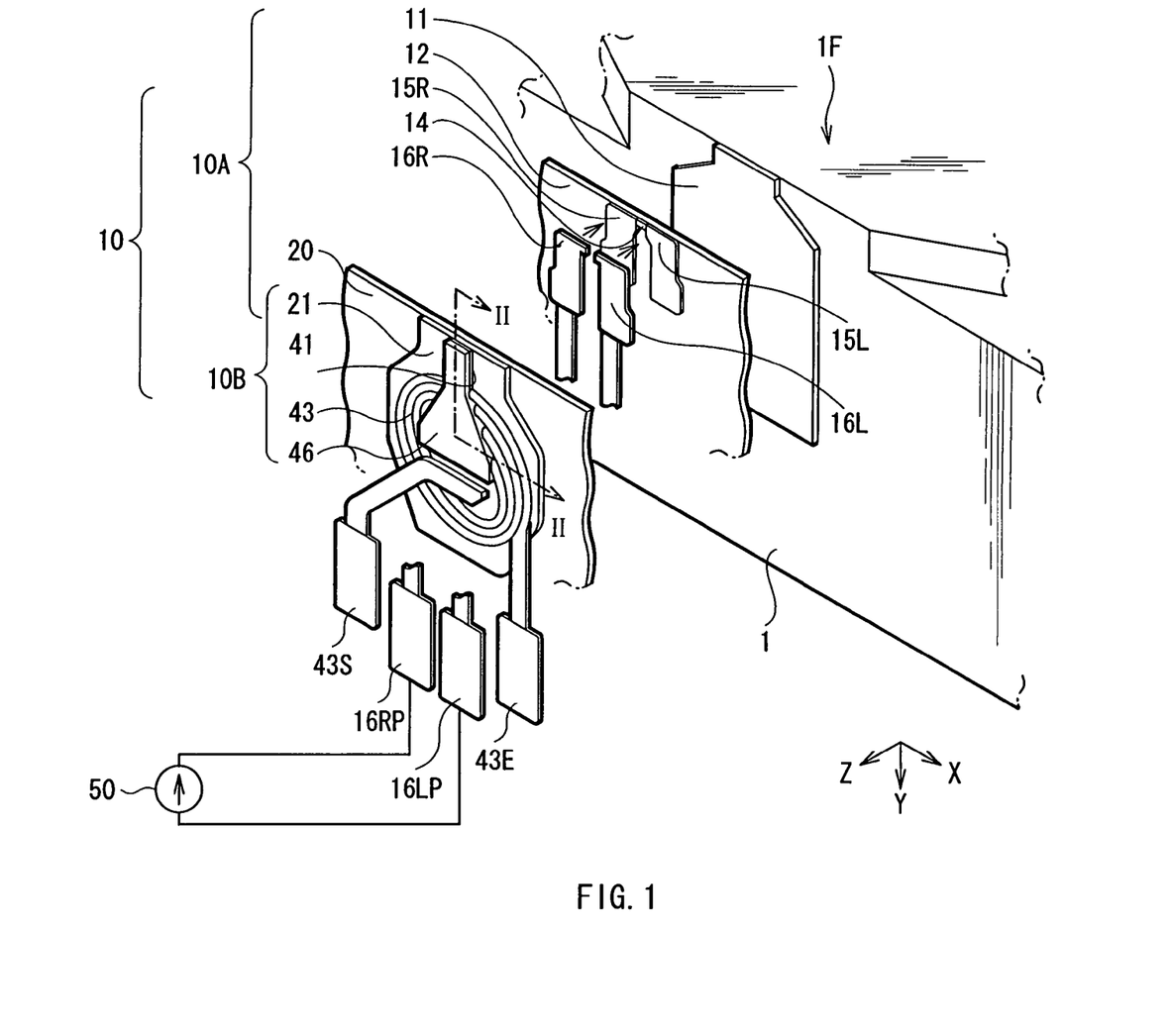
FIG. 1 is an exploded perspective view of a thin film magnetic head according to a first embodiment of the invention.

FIG. 1 is an exploded perspective view of a thin film magnetic head 10 which comprises a reproducing head portion 10A as a magnetoresistive device according to the embodiment, and is formed on a side of a slider in a magnetic disk drive such as a HDD (Hard Disc Drive). FIG. 2 is a sectional view taken along a line II-II of FIG. 1 in the direction of an arrow. FIG. 3 is a sectional view taken along a line III-III of FIG. 2 from the direction of an arrow. FIG. 2 and FIG. 3 show sectional views orthogonal to each other.

Figure 2:
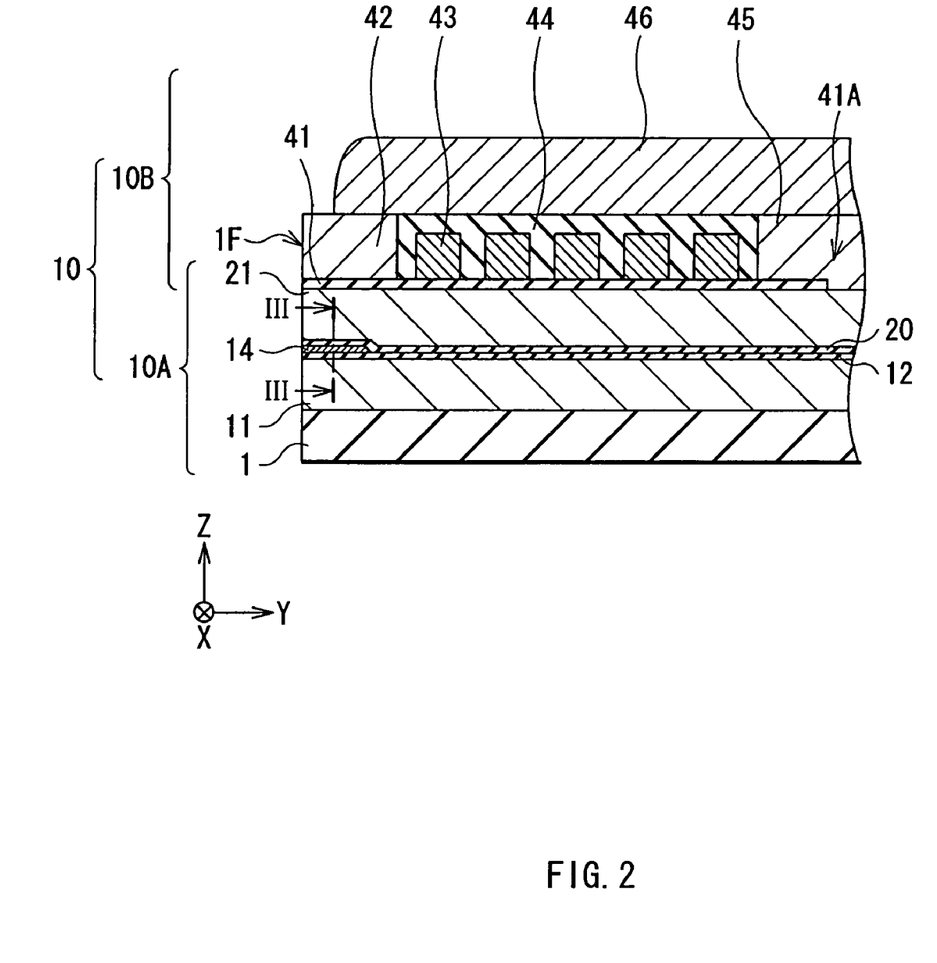
FIG. 2 is a sectional view of the thin film magnetic head taken along a line II-II of FIG. 1 from the direction of an arrow.

As shown in FIGS. 1 and 2, the thin film magnetic head 10 comprises the reproducing head portion 10A and a recording head portion 10B which are laminated in order as one unit on a side of a block-shaped base substrate 1 which is made of AlTiC ($Al_2O_3$·TiC) or the like and constitutes a slider. The reproducing head portion 10A reproduces magnetic information recorded on the recording surface of a magnetic disk (not shown), and the recording head portion 10B records magnetic information on the recording surface of the magnetic disk.

The reproducing head portion 10A has a CIP (Current In Plane)-GMR (Giant Magnetoresistive) structure in which a sense current flows into an MR film 14 in an in-plane direction of the laminate. More specifically, the reproducing head portion 10A includes a bottom shield layer 11, a bottom gap layer 12, the MR film 14, a top gap layer 20 and a top shield layer 21 which are laminated in order on the base substrate 1 on a side exposed to an air bearing surface (ABS) 1F facing the recording surface of the magnetic disk. A pair of magnetic domain control layers 15 (15L and 15R) and a pair of conductive lead layers 16 (16L and 16R) which extend adjacent to both end surfaces of the MR film 14 are disposed between the bottom gap layer 12 and the top gap layer 20 (refer to FIG. 3). Further, the top gap layer 20 is disposed so that a rear portion of the MR film 14 is surrounded with the top gap layer 20.

The bottom shield layer 11 and the top shield layer 21 are made of, for example, a soft magnetic metal material such as a nickel-iron alloy (NiFe), and the MR film 14 is sandwiched between the bottom shield layer 11 and the top shield layer 21 with the bottom gap layer 12 and the top gap layer 20 in between in a laminated direction (a Z direction), thereby the bottom shield layer 11 and the top shield layer 21 have a function of preventing an influence of an unnecessary magnetic field on the MR film 14. The bottom gap layer 12 is made of an insulating material such as aluminum oxide ($Al_2O_3$), aluminum nitride (AlN), silicon dioxide ($SiO_2$) or diamond-like carbon (DLC) to provide electrical isolation between the bottom shield layer 11 and the MR film 14. The top gap layer 20 is made of the same insulating material as that of the bottom gap layer 11 to provide electrical isolation between the top shield layer 20 and the MR film 14.

The MR film 14 functions as a sensor portion which detects a change in a signal magnetic field by recorded information on the magnetic disk, and has, for example, a spin-valve structure in which a base layer 31, a fixing layer (pinning layer) 32, a magnetization fixed layer (pinned layer) 33, a non-magnetic layer 34, a magnetization free layer (free layer) 35 and a cap layer 36 are laminated in order from the bottom gap layer 11.

The base layer (which is also called a buffer layer) 31 is made of, for example, a nickel-chromium alloy (NiCr) or the like with a thickness of 5 nm, and has a function of stabilizing exchange coupling between the fixing layer 32 and the magnetization fixed layer 33. The fixing layer 32 is made of an iridium-manganese alloy (IrMn) exhibiting antiferromagnetism with a thickness of, for example, 5.5 nm. The fixing layer 32 is in a state where a spin magnetic moment in a certain direction (a +Y direction) and a spin magnetic moment in the opposite direction (a −Y direction) perfectly cancel each other out, and functions as a so-called pinning layer which fixes the magnetization direction of the magnetization fixed layer 33 to a +Y direction or a −Y direction.

The magnetization fixed layer 33 has a three-layer structure called a so-called synthetic structure in which an outer pinned layer 331, an intermediate layer 332 and an inner pinned layer 333 are formed in order from the fixing layer 32. The outer pinned layer 331 has a magnetization direction J331 which is fixed in a first direction (a +Y direction), and the inner pinned layer 333 has a magnetization direction J333 which is fixed in a second direction (a −Y direction) opposite to the magnetization direction J331. The outer pinned layer 331 and the inner pinned layer 333 are made of a cobalt-iron alloy (CoFe), an iron-tantalum alloy (FeTa), NiFe, a cobalt-iron-boron alloy (CoFeB), an iron-nickel-cobalt alloy (FeNiCo) or the like with a thickness of, for example, 1.5 nm to 2.0 nm. Further, the intermediate layer 332 is made of a non-magnetic metal material such as copper (Cu), gold (Au), ruthenium (Ru), rhodium (Rh) or iridium (Ir) with a thickness of, for example, 0.8 nm. The outer pinned layer 331 and the inner pinned layer 333 are antiferromagnetically exchange coupled to each other with the intermediate layer 332 in between, and the magnetization directions J331 and J333 are fixed by the fixing layer 32. The outer pinned layer 331 may have a single-layer structure or a laminate structure. For example, the outer pinned layer 331 may have a structure in which three cobalt-iron alloy layers with different composition ratios (for example, "Co90Fe10/Fe70Co30/Co90Fe10" or the like) are laminated.

In the case where the saturation magnetization and the thickness of the outer pinned layer 331 are Ms1 and T1, respectively, and the saturation magnetization and the thickness of the inner pinned layer 333 are Ms2 and T2, respectively, the outer pinned layer 331 and the inner pinned layer 333 are formed so as to satisfy the following conditional expression (1). The units of numerical values are milliampere (mA).

$$0.6 \text{ mA} \leq (Ms2 \times T2 - Ms1 \times T1) \leq 1.5 \text{ mA} \quad (1)$$

The expression determines a ratio between the magnetic moments of the outer pinned layer 331 and the inner pinned layer 333.

The non-magnetic layer 34 is made of, for example, a non-magnetic metal material with high electrical conductivity (low electrical resistance) such as copper or gold with a thickness of, for example, 1.7 nm. The non-magnetic layer 34 has a function of separating magnetic coupling between the magnetization free layer 35 and the magnetization fixed layer 33 (mainly the inner pinned layer 333). A sense current Is which flows at the time of reading passes from the conductive lead layer 16R to the conductive lead layer 16L mainly through the non-magnetic layer 34. At this time, when the non-magnetic layer 34 is made of the above-described material with low electrical resistance, diffusion of the sense current Is can be minimized.

The magnetization free layer 35 has, for example, a thickness of 1 nm to 4 nm, and shows the magnetization direction which changes depending upon an external magnetic field (for example, a signal magnetic field from a magnetic disk). The magnetization free layer 25 may have a single-layer structure made of a ferromagnetic material such as a cobalt-iron alloy (CoFe) or a nickel-iron alloy (NiFe), or a three-layer structure in which a non-magnetic layer made of copper, ruthenium or the like is formed between a pair of ferromagnetic layers made of, for example, CoFe, NiFe or like. The cap layer 36 is made of, for example, copper, tantalum or the like with a thickness of 1 nm to 5 nm, and have a function of protecting the MR film 14 after its formation in a manufacturing process.

The pair of magnetic domain control layers 15 (15L and 15R) have a function of orienting the directions of magnetic domains in the magnetization free layer 35 through applying a magnetic bias to promote the formation of a single magnetic domain, and thereby to prevent Barkhausen noises. The pair of magnetic domain control layers 15 (15L and 15R) are made of, for example, a hard magnetic material such as a cobalt-platinum alloy (CoPt). The pair of conductive lead layers 16 (16L and 16R) is a current path for flowing the sense current Is into the MR film 14 in an in-plane direction of the laminate (herein a +X direction), and are connected to a pair of electrodes 16LP and 16RP, respectively. The pair of electrodes 16LP and 16RP are connected to a constant current circuit 51 as a current supply means, and the sense current Is flows into the MR film 14 through the pair of conductive lead layers 16 (16L and 16R).

In the reproducing head portion 10A with such a structure, the magnetization direction of the magnetization free layer 35 in the MR film 14 changes depending upon a signal magnetic field from the magnetic disk. Therefore, a change relative to the magnetization direction J333 of the inner pinned layer 333 occurs. When the sense current Is flows into the MR film 14 through the pair of conductive lead layers 16, a relative change in the magnetization direction appears as a change in electrical resistance, so a signal magnetic field is detected through the use of the change in electrical resistance to read out magnetic information.

On the other hand, the recording head portion 10B includes a top shield layer 21 which functions as a bottom pole, a write gap layer 41, a pole tip 42, a coil 43, an insulating layer 44, connecting portion 45 and a top pole 46.

The write gap layer 41 is formed of an insulating layer such as $Al_2O_3$, and has an opening 41A for forming a magnetic path in a position corresponding to a central portion in a XY plane of the coil 43. The coil 43 made of copper (Cu), gold (Au) or the like is disposed on the write gap layer 41 so as to be spirally wound around the opening 41A, and is covered with the insulating layer 44 made of photoresist or the like. Both ends of the coil 43 are connected to electrodes 43S and 43E, respectively. The top pole 46 is formed so as to be laid over the write gap layer 41, the opening 41A and the insulating layer 44. The top pole 46 is made of, for example, a soft magnetic material with a high saturation magnetic flux density such as a nickel-iron alloy (NiFe), and the top pole 46 is connected to the top shield layer 21 in the opening 41A through the connecting portion 45, and the top pole 46 and the top shield layer 21 are magnetically coupled to each other.

In the recording head portion 10B with such a structure, a magnetic flux is generated mainly in a magnetic path including the top shield layer 21 as the bottom pole and the top pole 46 by a write current flowing through the coil 43. Thereby, a signal magnetic field is generated in proximity to the write gap layer 41, so a predetermined region on the recording surface of the magnetic disk is magnetized by the signal magnetic field to record information.

Next, referring to FIGS. 1 through 3, a method of manufacturing the thin film magnetic head 10 will be described below.

At first, the bottom shield layer 11 is selectively formed by a frame plating method or the like in a region of the base substrate 1 where the thin film magnetic head 10 is to be formed. The bottom shield layer 11 is formed so as to have a thickness of 0.5 μm to 3 μm. As the material of the bottom shield layer 11, in addition to NiFe, a cobalt-iron-nickel alloy (CoFeNi), a cobalt-iron alloy (CoFe), iron nitride (FeN), iron zirconium nitride (FeZrN) and the like can be used. Next, the bottom gap layer 12 with a thickness of, for example, 10 nm to 50 nm is formed through sputtering or the like so as to be laid over the bottom shield layer 11.

Next, the MR film 14 is formed on the bottom gap layer 12 in a position closest to the ABS 1F, and the magnetic domain control layers 15L and 15R and the conductive lead layers 16L and 16R which are adjacent to the MR film 14 are formed. In this case, at first, a multilayer film in which the base layer 31, the fixing layer 32, the magnetization fixed layer 33, the non-magnetic layer 34, the magnetization free layer 35 and the cap layer 36 are laminated in order is formed by a sputtering method or the like so as to be laid over the whole bottom gap layer 12, and a mask pattern (not shown) is formed so as to be selectively laid over the multilayer film. The mask pattern has an opening corresponding to the shapes of the magnetic domain control layers 15L and 15R and the conductive lead layers 16L and 16R. After the above multilayer film is etched through milling with the mask pattern, the magnetic domain control layers 15L and 15R and the conductive lead layers 16L and 16R are laminated in order in a region where the multilayer film is removed by a sputtering method. After that, the mask pattern is melted away with an organic solvent such as acetone or N-methylpyrrolidone (NMP). Further, another mask pattern (not shown) with the shape of the combination of the MR film 14 and the conductive lead layers 16L and 16R is formed to remove an unnecessary portion of the multilayer film through milling using the mask pattern as a mask. Thus, the formation of the MR film 14, the magnetic domain control layers 15L and 15R and the conductive lead layers 16L and 16R is completed. In addition, in order to easily melt the mask patterns away, the above-described mask patterns preferably have an inverse trapezoidal shape (the shape in which the width in the bottom side is the narrowest, and the width gradually increases toward the top side) in cross section.

After that, the top gap layer 20 is formed so as to be laid over the MR film 14, the magnetic domain control layers 15L and 15R and the conductive lead layers 16L and 16R. In this case, the top gap layer 20 is formed by a sputtering method, a CVD method or the like so as to have, for example, a thickness of 10 nm to 50 nm. Further, the top shield layer 21 with a thickness of 0.5 μm to 3.0 μm is formed on the top gap layer 20 by a frame plating method or the like. The top gap layer 20 and the top shield layer 21 are formed so as to occupy at least a region corresponding to the bottom shield layer 11. Thereby, the formation of the reproducing head portion 10A is completed temporarily.

Next, the write gap layer 41 having the opening 41A is formed so as to be selectively laid over the top shield layer 21. In this case, the write gap layer 41 is formed by a sputtering method or a CVD method so as to have a thickness of 10 nm to 50 nm.

After forming the write gap layer 41, the pole tip 42, the coil 43 and the connecting portion 45 are formed by a frame plating method. Further, after the insulating layer 44 is formed so as to be laid over the coil 43, the top pole 46 is formed by a frame plating method or the like so as to be laid over the whole.

Finally, a protective film is formed through sputtering or the like so as to be laid over all layers including the top pole 46, and then a planarization process is performed by CMP or the like. Thereby, the formation of the recording head portion 10B is completed temporarily. After that, the thin film magnetic head 10 is completed through predetermined steps such as a step of forming ABS 1F, for example, through mechanically polishing the base substrate 1.

Next, a method of driving the reproducing head portion 10A in the thin film magnetic head 10 with the above-described structure and functions of the reproducing head portion 10A will be described below.

In the embodiment, as the conditional expression (1) which determines a ratio between the magnetic moments of the outer pinned layer 331 and the inner pinned layer 333 is satisfied, the magnetization direction J333 of the inner pinned layer 333 dominates over the magnetization direction J331 of the outer pinned layer 331. Therefore, when a current magnetic field is generated in a direction which assists the magnetization direction J333 (−Y direction), the magnetization directions J331 and J333 can be stabilized, and an exchange coupling force with the fixing layer 32 can be increased. In the case where the magnetic information on the magnetic disk is read out (sensed) through the use of the reproducing head portion 10A, the sense current Is flows in a +X direction so as to pass through the interior of the MR film 14 (substantially through the non-magnetic layer 34), thereby a current magnetic field toward a −Y direction is generated in the inner pinned layer 333. As a result, exchange coupling between the magnetization fixed layer 33 and the fixing layer 32 is stabilized, and the heat resistance of the MR film 14 is improved, so sufficient output characteristics can be stably obtained under a higher temperature environment.

In the case where the ratio falls below the lower limit of the conditional expression (1), when the sense current Is flows in a +X direction so as to pass through the interior of the MR film 14, the magnetization directions J331 and J333 are reversed, so accurate sensing may not be possible. On the other hand, in the case where the ratio exceeds the upper limit of the conditional expression (1), an influence of a leakage magnetic field from the magnetization fixed layer 33 on the magnetization free layer 35 is considerably large, thereby a problem that the symmetry of a reproduction waveform is deteriorated arises. Therefore, it is not preferable.

Thus, in the embodiment, the sense current Is flows into the MR film 14 which includes the fixing layer 32 made of IrMn and satisfies the conditional expression (1) in a +X direction to generate a current magnetic field toward a −Y direction in the inner pinned layer 333, so even under a high temperature environment, stable output characteristics can be obtained. Therefore, it is advantageous to obtain a higher recording density.

Second Embodiment

Next, referring to FIG. 4, a thin film magnetic head according to a second embodiment of the invention will be described below.

Figure 3:
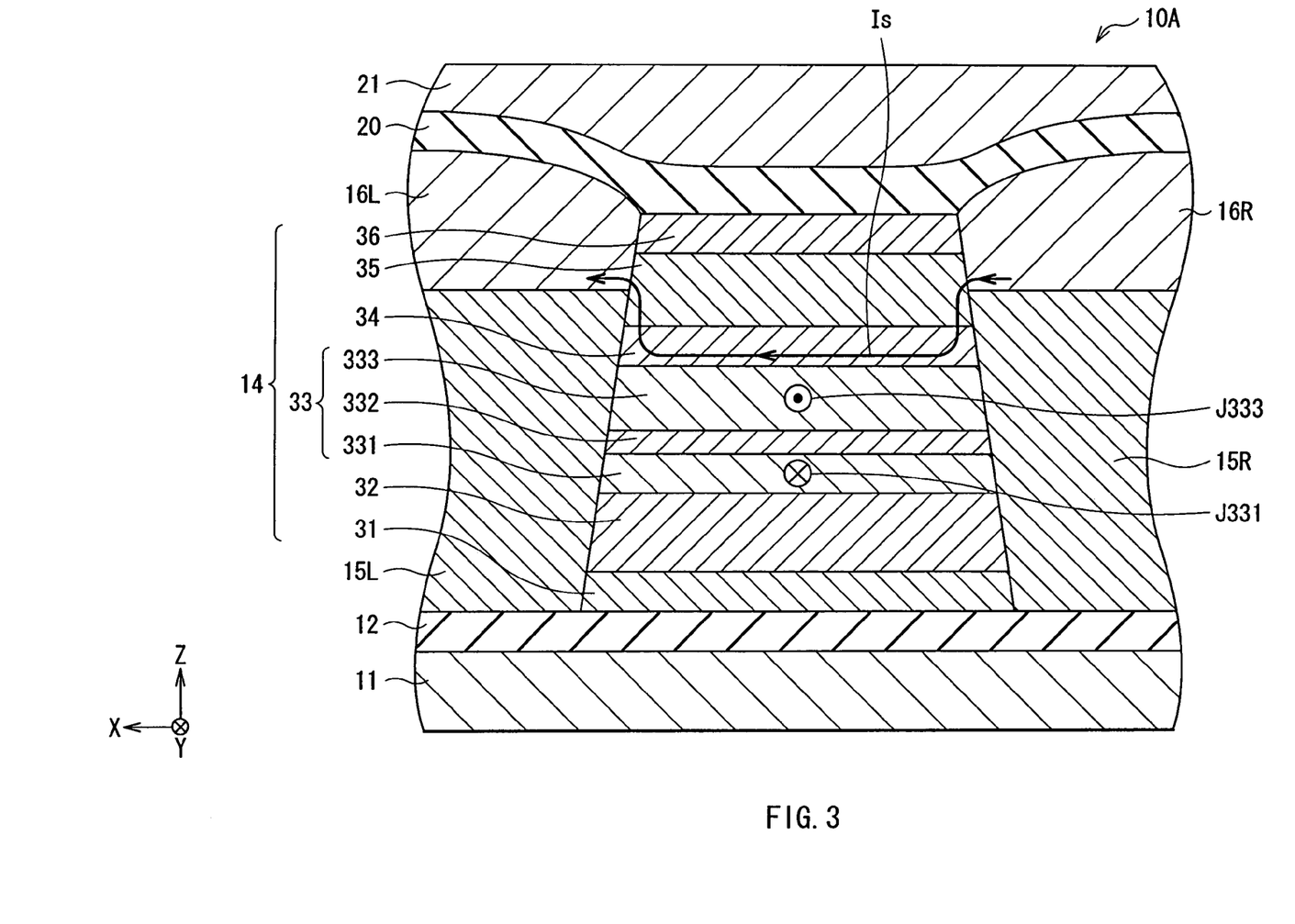
FIG. 3 is a sectional view of a main part of the thin film magnetic head taken along a line III-III of FIG. 2 from the direction of an arrow.
Figure 4:
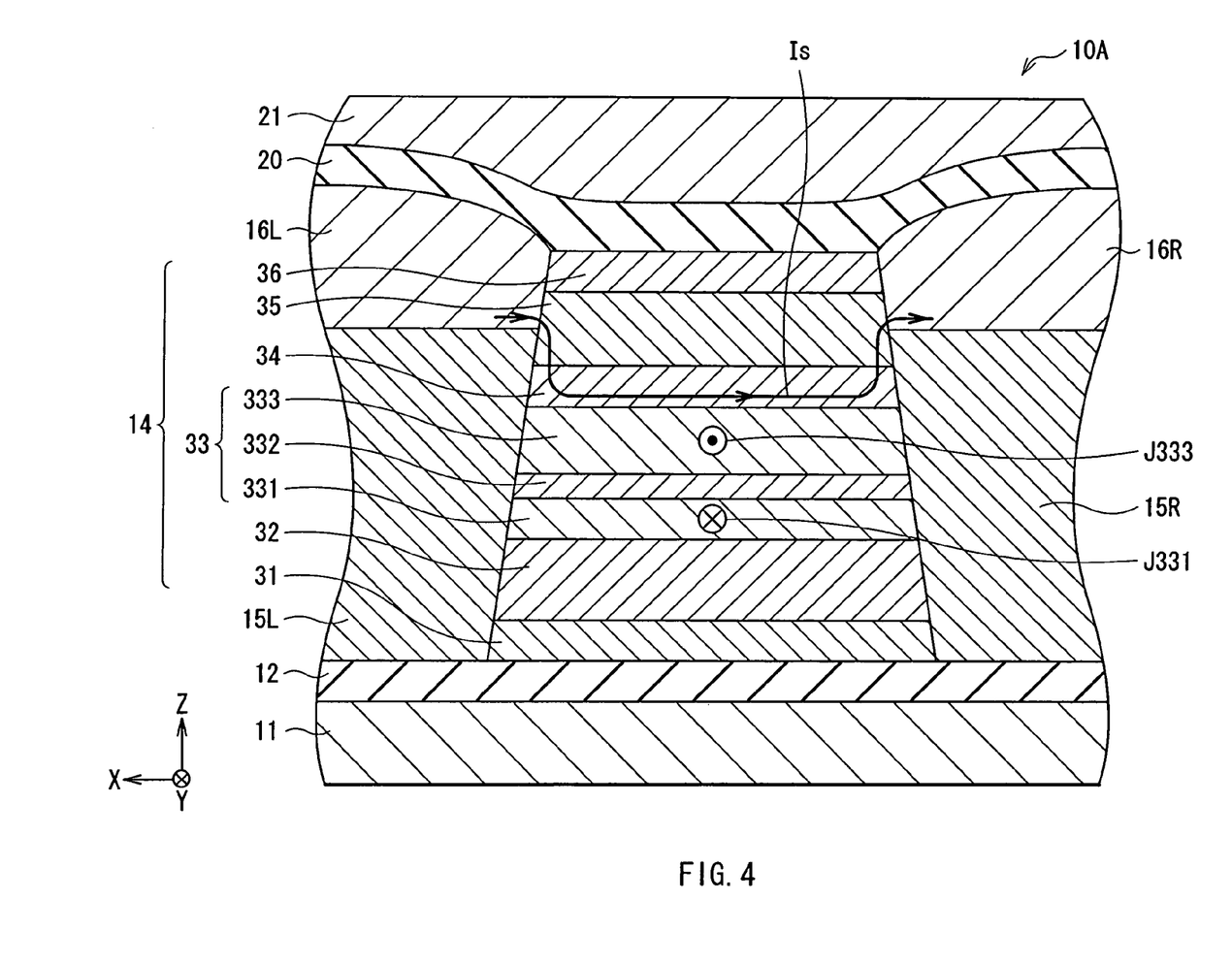
FIG. 4 is a sectional view of a main part of a thin film magnetic head according to a second embodiment of the invention.

FIG. 4 shows a sectional view of the reproducing head portion 10A in the thin film magnetic head 10 according to the embodiment, and corresponds to FIG. 3 in the first embodiment. In FIG. 4, like components are donated by like numerals as of FIG. 3.

In the following description, only points of the structure of the reproducing head portion 10A and a method of driving the reproducing head portion 10A according to the second embodiment which are different from those in the first embodiment will be mainly described.

In the first embodiment, the magnetization fixed layer 33 is formed so as to satisfy the conditional expression (1) and a driving method in this case is described above. On the other hand, in the embodiment, the magnetization fixed layer 33 is formed so as to satisfy the following conditional expression (2).

$$-1.5 \text{ mA} \leq (Ms2 \times T2 - Ms1 \times T1) \leq 0.38 \text{ mA} \tag{2}$$

In the embodiment, the conditional expression (2) which determines a ratio between the magnetic moments of the outer pinned layer 331 and the inner pinned layer 333 is satisfied. The conditional expression (2) includes a range (a range in the following conditional expression (3)) in which it is generally expected that the magnetization direction J333 of the inner pinned layer 333 dominates over the magnetization direction J331 of the outer pinned layer 331; however, in fact (as will be described later in Example 1), the magnetization direction J331 of the outer pinned layer 331 dominates over the magnetization direction J333 of the inner pinned layer 333. Therefore, when a current magnetic field is generated in a direction which assists the magnetization direction J331 (+Y direction), the magnetization directions J331 and J333 can be stabilized, and an exchange coupling force with the fixing layer 32 can be increased. Therefore, in the case where the magnetic information on the magnetic disk is read out (sensed) through the use of the reproducing head portion 10A according to the embodiment, the sense current Is flows in a −X direction so as to pass through the interior of the MR film 14 (substantially through the non-magnetic layer 34), thereby a current magnetic field toward a +Y direction is generated in the outer pinned layer 331. As a result, exchange coupling between the magnetization fixed layer 33 and the fixing layer 32 is stabilized, and the heat resistance of the MR film 14 is improved, so sufficient output characteristics can be stably obtained under a higher temperature environment.

In the case where the ratio exceeds the upper limit of the conditional expression (2), when the sense current Is flows toward a −X direction so as to pass through the interior of the MR film 14, the magnetization directions J331 and J333 are reversed, so accurate sensing may not be possible. On the other hand, in the case where the ratio falls below the lower limit of the conditional expression (2), an influence of a leakage magnetic field from the magnetization fixed layer 33 on the magnetization free layer 35 is considerably large, thereby a problem that the symmetry of a reproduction waveform is deteriorated arises. Therefore, it is not preferable. In the embodiment, specifically when the following conditional expression (3) is satisfied, a balance between the magnetic moments of the outer pinned layer 331 and the inner pinned layer 333 becomes better, and the leakage magnetic field from the magnetization fixed layer 33 can be reduced, so it is advantageous to stabilize the magnetization direction of the magnetization free layer 35.

$$0 \text{ mA} < (Ms2 \times T2 - Ms1 \times T1) \leq 0.38 \text{ mA} \tag{3}$$

Thus, in the embodiment, the sense current Is flows in a −X direction into the MR film 14 which includes the fixing layer 32 made of IrMn and satisfies the conditional expression (2) (more preferably the conditional expression (3)) to generate a current magnetic field toward a +Y direction in the outer pinned layer 331, so even under a high temperature environment, stable output characteristics can be obtained. Therefore, it is advantageous to obtain a higher recording density.

EXAMPLES

Next, specific examples of the invention will be described below.

In examples of the invention described below, samples of the thin film magnetic head comprising the MR device in FIG. 3 or 4 described in the above embodiments were formed, and a change in the magnetization directions of the outer pinned layer and the inner pinned layer in the case where the sense current Is flew in a predetermined direction was examined.

Example 1

In the example, a sense current of 4 mA was applied to the MR film 14 with the following structure under an environmental temperature of 130° C. to examine how the magnetization directions J331 and J333 of the outer pinned layer 331 and the inner pinned layer 333 changed. The results are shown in Table 1.

reversal rate of the magnetization direction means a probability of reversing the magnetization directions J333 and J331 of the inner pinned layer 333 and the outer pinned layer 331 in the case where the sense current Is flew in a +X direction (direction assisting the inner pinned layer) or in a −X direction (direction assisting the outer pinned layer). More specifically, when the reversal rate was 0%, it showed that the magnetization directions J333 and J331 in all samples were not reversed under the condition. On the other hand, when the reversal rate was 100%, it showed that the magnetization directions J333 and J331 in all samples were reversed under the condition.

It was obvious from the results of Table 1 that in the case where the difference in the thickness of the magnetic film Δ(Ms×T) was 0.60 mA or over (in the case of Condition

TABLE 1

| | | | | REVERSAL RATE OF MAGNETIZATION DIRECTION [%] | |
| --- | --- | --- | --- | --- | --- |
| | THICKNESS | THICKNESS | | DIRECTION OF SENSE CURRENT | |
| CONDITION NO. | OF OUTER PINNED LAYER [nm] | OF INNER PINNED LAYER [nm] | Δ (Ms × T) [mA] | +X DIRECTION (ASSISTING INNER PINNED LAYER) | −X DIRECTION (ASSISTING OUTER PINNED LAYER) |
| 1 | 1.50 | 2.00 | 0.76 | 0 | 100 |
| 2 | 1.50 | 1.95 | 0.68 | 0 | 88 |
| 3 | 1.50 | 1.90 | 0.60 | 0 | 57 |
| 4 | 1.50 | 1.85 | 0.53 | 7 | 28 |
| 5 | 1.50 | 1.80 | 0.45 | 14 | 14 |
| 6 | 1.50 | 1.75 | 0.38 | 22 | 0 |
| 7 | 1.50 | 1.70 | 0.30 | 34 | 0 |
| 8 | 1.50 | 1.65 | 0.23 | 48 | 0 |
| 9 | 1.50 | 1.60 | 0.15 | 57 | 0 |
| 10 | 1.50 | 1.55 | 0.08 | 88 | 0 |
| 11 | 1.50 | 1.50 | 0.00 | 100 | 0 |
| 12 | 1.55 | 1.50 | −0.08 | 100 | 0 |
| 13 | 1.60 | 1.50 | −0.15 | 100 | 0 |
| 14 | 1.65 | 1.50 | −0.23 | 100 | 0 |
| 15 | 1.70 | 1.50 | 0.30 | 100 | 0 |
| 16 | 1.75 | 1.50 | −0.38 | 100 | 0 |
| 17 | 1.80 | 1.50 | −0.45 | 100 | 0 |
| 18 | 1.85 | 1.50 | −0.53 | 100 | 0 |
| 19 | 1.90 | 1.50 | −0.60 | 100 | 0 |
| 20 | 1.95 | 1.50 | −0.68 | 100 | 0 |
| 21 | 2.00 | 1.50 | −0.76 | 100 | 0 |

The MR film 14 of the example included the base layer 31 made of NiCr with a thickness of 5 nm, the fixing layer 32 made of IrMn with a thickness of 5.5 nm, the outer pinned layer 331 made of $Co_{90}Fe_{10}$, the intermediate layer 332 made of ruthenium with a thickness of 0.8 nm, the inner pinned layer 333 made of $Co_{90}Fe_{10}$, the non-magnetic layer 34 made of copper with a thickness of 1.7 nm, the magnetization free layer 35 with a two-layer structure including a CoFe layer with a thickness of 1.0 nm and a NiFe layer with a thickness of 2.0 nm, and the cap layer 36 including a ruthenium layer with a thickness of 0.5 nm and a tantalum layer with a thickness of 2.0 nm which were laminated in order. The saturation magnetization Ms of $Co_{90}Fe_{10}$ was 1510 kA/m.

Table 1 shows "condition No.", "thickness of outer pinned layer (nm)", "thickness of inner pinned layer (nm)", "difference in product of saturation magnetization and thickness (hereinafter referred to as the thickness of the magnetic film) Δ(Ms×T)=Ms2×T2−Ms1×T1 (mA)", and "reversal rate of magnetization direction (%)" in order from the left. The Nos. 1 through 3), when the sense current Is flew in a +X direction (a direction assisting the inner pinned layer), the magnetization directions J333 and J331 could be stabilized. This state corresponds to the first embodiment (refer to FIG. 3). On the other hand, when the sense current Is flew in a −X direction (a direction assisting the outer pinned layer) under the condition, the magnetization directions J333 and J331 were reversed at a rate of 57% to 100%. Moreover, in the case where the difference in the thickness of the magnetic film Δ(Ms×T) was 0.38 mA or less (in the case of Condition Nos. 6 through 21), when the sense current Is flew in a −X direction (a direction assisting the outer pinned layer), the magnetization directions J333 and J331 could be stabilized. This condition corresponds to the second embodiment (refer to FIG. 4). When the sense current Is flew in a +X direction (a direction assisting the inner pinned layer) under the condition, the magnetization directions J333 and J331 were reversed at a rate of 22% to 100%.

In the case where the difference in the thickness of the magnetic film Δ(Ms×T) was larger than 0 and equal to or less than 0.38 mA, it was expected that the magnetization direction J333 of the inner pinned layer 333 dominated in principle (because the inner pinned layer 333 was larger in thickness than the outer pinned layer 331). However, in fact, under the condition, the magnetization direction J331 of the outer pinned layer 331 dominated, so when the sense current flew in a −X direction (a direction assisting the outer pinned layer), a result that the magnetization direction of the magnetization fixed layer 33 was stabilized was obtained.

Figure 5:
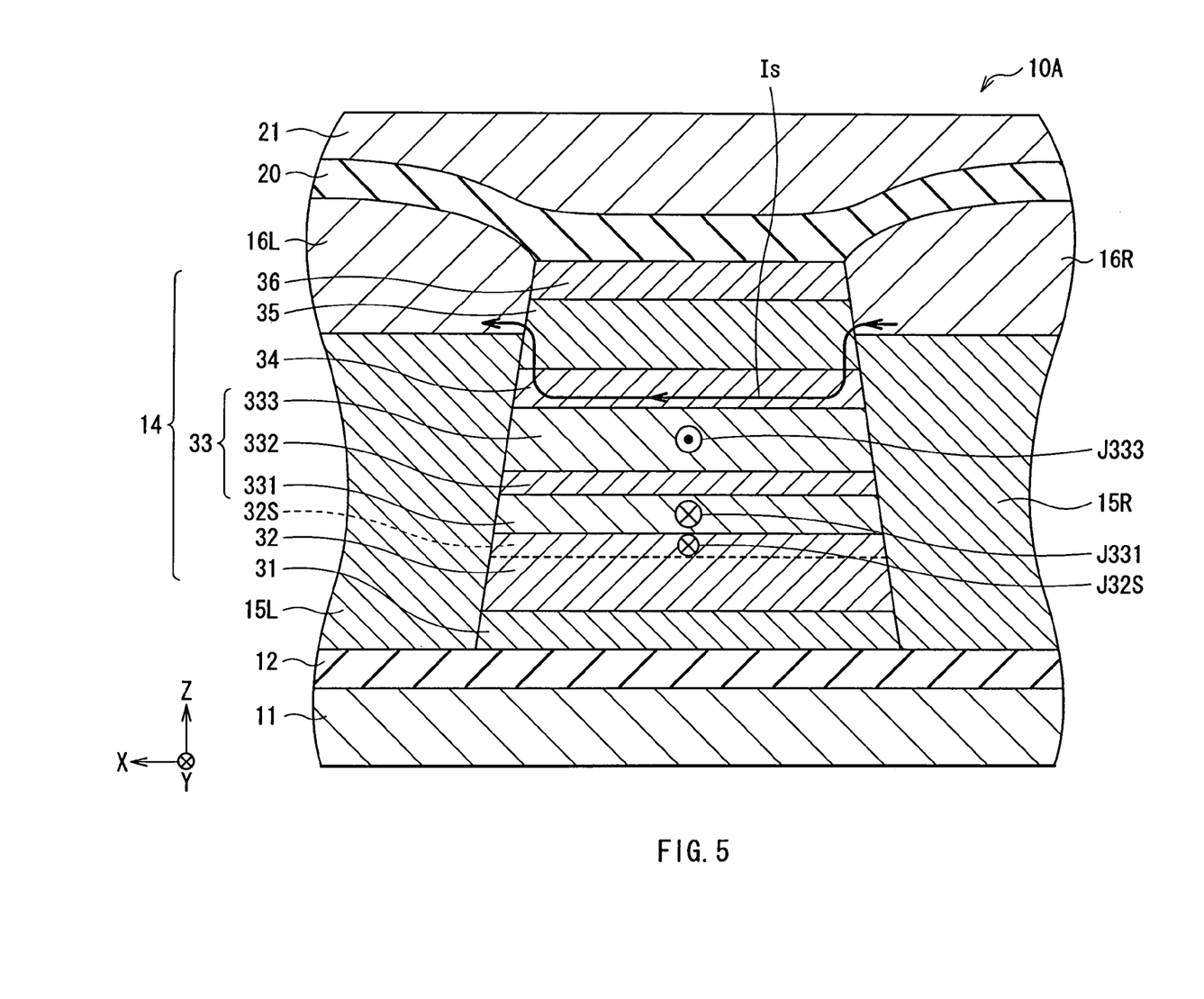
FIG. 5 is a sectional view of a main part of a thin film magnetic head corresponding to FIG. 3.

As shown in FIG. 5, it could be considered that as a layer (ferromagnetic interface layer 32S) showing ferromagnetic behavior in proximity to an interface adjacent to the outer pinned layer 331 in the fixing layer 32 was formed, an influence by the layer caused the above result. In other words, it could be considered that the ferromagnetic interface layer 32S had the same magnetization direction J32S as that of the outer pinned layer 331, thereby the condition of the difference in the thickness of the magnetic film Δ(Ms×T) which maintained a balance between the magnetic moment of the combination of the ferromagnetic interface layer 32S and the outer pinned layer 331 and the magnetic moment of the inner pinned layer 333 was within the range of the conditional expression (3). Therefore, in the case where the outer pinned layer 331 and the inner pinned layer 333 were formed of the same material, when the thickness T2 of the inner pinned layer 333 was slightly larger than the thickness T1 of the outer pinned layer 331, a balance between their magnetic moments became better, so a leakage magnetic field from the magnetization fixed layer 33 which might adversely affect the magnetization free layer 35 or the like could be reduced.

In the case where the difference in the thickness of the magnetic film Δ(Ms×T) was larger than 0.38 mA and less than 0.60 mA (in the case of Condition Nos. 4 and 5), even if the sense current Is flew either in a +X direction or a −X direction, the magnetization directions J333 and J331 were reversed, so they were not stabilized.

As described above, in the example, it was confirmed that when the conditional expression (1) was satisfied, the sense current flew in a +X direction so as to generate a current magnetic field toward a −Y direction in the inner pinned layer 333 and when the conditional expression (2) was satisfied, the sense current flew in a −X direction so as to generate a current magnetic field toward a +Y direction in the outer pinned layer 331, thereby even under a high temperature environment of 130° C., the magnetization directions J331 and J333 of the outer pinned layer 331 and the inner pinned layer 333 were stabilized.

Example 2

In the example, a sense current of 4 mA was applied to the MR film 14 with the following structure under an environmental temperature of 130° C. to examine how the magnetization directions J331 and J333 of the outer pinned layer 331 and the inner pinned layer 333 were changed. The results are shown in Table 2.

TABLE 2

| | | | | REVERSAL RATE OF MAGNETIZATION DIRECTION [%] DIRECTION OF SENSE CURRENT | |
|---|---|---|---|---|---|
| CONDITION NO. | THICKNESS OF OUTER PINNED LAYER [nm] | THICKNESS OF INNER PINNED LAYER [nm] | Δ (Ms × T) [mA] | +X DIRECTION (ASSISTING INNER PINNED LAYER) | −X DIRECTION (ASSISTING OUTER PINNED LAYER) |
| 22 | 0.5/0.5/0.5 | 2.00 | 0.62 | 0 | 43 |
| 23 | 0.5/0.5/0.5 | 1.95 | 0.54 | 9 | 24 |
| 24 | 0.5/0.5/0.5 | 1.90 | 0.47 | 16 | 13 |
| 25 | 0.5/0.5/0.5 | 1.85 | 0.39 | 21 | 0 |
| 26 | 0.5/0.5/0.5 | 1.80 | 0.32 | 38 | 0 |
| 27 | 0.5/0.5/0.5 | 1.75 | 0.24 | 51 | 0 |
| 28 | 0.5/0.5/0.5 | 1.70 | 0.17 | 56 | 0 |
| 29 | 0.5/0.5/0.5 | 1.65 | 0.09 | 89 | 0 |
| 30 | 0.5/0.5/0.5 | 1.60 | 0.02 | 100 | 0 |
| 31 | 0.5/0.5/0.5 | 1.55 | −0.06 | 100 | 0 |
| 32 | 0.5/0.5/0.5 | 1.50 | −0.14 | 100 | 0 |
| 33 | 0.5/0.5/0.55 | 1.50 | −0.21 | 100 | 0 |
| 34 | 0.5/0.5/0.6 | 1.50 | −0.29 | 100 | 0 |
| 35 | 0.5/0.5/0.65 | 1.50 | −0.36 | 100 | 0 |
| 36 | 0.5/0.5/0.7 | 1.50 | −0.44 | 100 | 0 |
| 37 | 0.5/0.5/0.75 | 1.50 | −0.51 | 100 | 0 |
| 38 | 0.5/0.5/0.8 | 1.50 | −0.59 | 100 | 0 |
| 39 | 0.5/0.5/0.85 | 1.50 | −0.66 | 100 | 0 |
| 40 | 0.5/0.5/0.90 | 1.50 | −0.74 | 100 | 0 |
| 41 | 0.5/0.5/0.95 | 1.50 | −0.81 | 100 | 0 |
| 42 | 0.5/0.5/1.0 | 1.50 | −0.89 | 100 | 0 |

The MR film 14 of the example included the base layer 31 made of NiCr with a thickness of 5 nm, the fixing layer 32 made of IrMn with a thickness of 5.5 nm, the outer pinned layer 331 with a three-layer structure including a $Co_{90}Fe_{10}$ layer with a thickness of 0.5 nm, a $Fe_{70}CO_{30}$ layer with a thickness of 0.5 nm and a $Co_{90}Fe_{10}$ layer with a thickness of 0.5 nm to 1.0 nm, the intermediate layer 332 made of ruthenium with a thickness of 0.8 nm, the inner pinned layer 333 made of $Co_{90}Fe_{10}$, the non-magnetic layer 34 made of copper with a thickness of 1.7 nm, the magnetization free layer 35 with a two-layer structure including a CoFe layer with a thickness of 1.0 nm and a NiFe layer with a thickness of 2.0 nm, and a cap layer 36 including a ruthenium layer with a thickness of 0.5 nm and a tantalum layer with a thickness of 2.0 nm which were laminated in order. The saturation magnetization Ms of $Co_{90}Fe_{10}$ was 1510 kA/m, and the saturation magnetization Ms of $Fe_{70}C_{30}$ layer was 1780 kA/m.

It was obvious from the results in Table 2 that in the case where the difference in the thickness of the magnetic film $\Delta(Ms \times T)$ was 0.60 mA or over, (in the case of Condition No. 22), when the sense current Is flew in a +X direction (a direction assisting the inner pinned layer), the magnetization directions J333 and J331 could be stabilized. This state corresponds to the first embodiment (refer to FIG. 3). Moreover, in the case where the difference in the thickness of the magnetic film $\Delta(Ms \times T)$ was 0.39 mA or less (in the case of Condition Nos. 25 through 42), when the sense current Is flew in a −X direction (a direction assisting the outer pinned layer), the magnetization directions J333 and J331 could be stabilized. This state corresponds to the second embodiment (refer to FIG. 4). In this case, when the sense current Is flew in a +X direction (a direction assisting the inner pinned layer), as a result, the magnetization directions J333 and J331 were reversed at a rate of 22% to 100%.

In the case where the difference in the thickness of the magnetic film $\Delta(Ms \times T)$ was larger than 0.39 mA and less than 0.60 mA (in the case of Condition Nos. 23 and 24), even if the sense current Is flew either in a +X direction or a −X direction, the magnetization directions J333 and J331 were reversed, so they were not stabilized.

Thus, in the example, unlike Example 1, the outer pinned layer with a three-layer structure was included; however, the same result as that in Example 1 was obtained.

The invention is described referring to the embodiments and the examples; however, the invention is not limited to them, and variously modified. For example, in the embodiments and the examples, as the first ferromagnetic layer and the second ferromagnetic layer in the magnetization fixed layer, a cobalt-iron alloy is used; however, the invention is not limited to this, and any other ferromagnetic material may be used.

Obviously many modifications and variations of the present invention are possible in the light of the above teachings. It is therefore to be understood that within the scope of the appended claims the invention may be practiced otherwise than as specifically described.

What is claimed is:

1. A magnetoresistive device, comprising:
a magnetoresistive film including: a fixing layer including an iridium-manganese alloy (IrMn); a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer; a non-magnetic layer disposed on a side of the magnetization fixed layer opposite to a side where the fixing layer is disposed; and a magnetization free layer disposed on a side of the non-magnetic layer opposite to a side where the magnetization fixed layer is disposed and changing its magnetization direction according to an external magnetic field;
a pair of conductive lead layers extending so as to be disposed adjacent to at least parts of both end surfaces of the magnetoresistive film and to face each other; and
a current supply means for flowing a sense current in a direction where a current magnetic field toward the second direction is generated in the second ferromagnetic layer in an in-plane direction of the laminate of the magnetoresistive film through the pair of conductive lead layers,
wherein the following conditional expression (1) is satisfied:

$$0.6 \text{ mA} \leq (Ms2 \times T2 - Ms1 \times T1) \leq 1.5 \text{ mA} \tag{1}$$

where Ms1 is the saturation magnetization of the first ferromagnetic layer; T1 is the thickness of the first ferromagnetic layer; Ms2 is the saturation magnetization of the second ferromagnetic layer; and T2 is the thickness of the second ferromagnetic layer.

2. A thin film magnetic head, comprising:
a magnetoresistive device according to claim 1.

3. A head gimbal assembly, comprising:
a magnetic head slider including a thin film magnetic head which includes a magnetoresistive device according to claim 1 on a side of the magnetic head slider; and
a suspension to which the magnetic head slider is attached at an end thereof.

4. A head arm assembly, comprising:
a magnetic head slider including a thin film magnetic head which includes a magnetoresistive device according to claim 1 on a side of the magnetic head slider;
a suspension to which the magnetic head slider is attached at an end thereof; and
an arm supporting the other end of the suspension.

5. A magnetic disk drive comprising:
a magnetic recording medium; and
a head arm assembly,
wherein the head arm assembly comprises:
a magnetic head slider including a thin film magnetic head which includes a magnetoresistive device according to claim 1 on a side of the magnetic head slider;
a suspension to which the magnetic head slider is attached at an end thereof; and
an arm supporting the other end of the suspension.

6. A magnetoresistive device, comprising:
a magnetoresistive film including: a fixing layer including an iridium-manganese alloy (IrMn); a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer; a non-magnetic layer disposed on a side of the magnetization fixed layer opposite to a side where the fixing layer is disposed; and a magnetization free layer disposed on a side of the non-magnetic layer opposite to a side where the magnetization fixed layer is disposed and changing its magnetization direction according to an external magnetic field;
a pair of conductive lead layers extending so as to be disposed adjacent to at least parts of both end surfaces of the magnetoresistive film and to face each other; and
a current supply means for flowing a sense current in a direction where a current magnetic field toward the first direction is generated in the first ferromagnetic layer in an in-plane direction of the laminate of the magnetoresistive film through the pair of conductive lead layers,
wherein the following conditional expression (2) is satisfied:

$$-1.5 \text{ mA} \leq (Ms2 \times T2 - Ms1 \times T1) \leq 0.38 \text{ mA} \tag{2}$$

where Ms1 is the saturation magnetization of the first ferromagnetic layer; T1 is the thickness Of the first ferromagnetic layer; Ms2 is the saturation magnetization of the second ferromagnetic layer; and T2 is the thickness of the second ferromagnetic layer.

7. A magnetoresistive device according to claim 6, wherein the following conditional expression (3) is satisfied:

$$0 \text{ mA} < (Ms2 \times T2 - Ms1 \times T1) \leq 0.38 \text{ mA} \tag{3}$$

8. A thin film magnetic head, comprising:
a magnetoresistive device according to claim 7.

9. A head gimbal assembly, comprising:
a magnetic head slider including a thin film magnetic head which includes a magnetoresistive device according to claim 7 on a side of the magnetic head slider; and
a suspension to which the magnetic head slider is attached at an end thereof.

10. A head arm assembly, comprising:
a magnetic head slider including a thin film magnetic head which includes a magnetoresistive device according to claim 7 on a side of the magnetic head slider;
a suspension to which the magnetic head slider is attached at an end thereof; and
an arm supporting the other end of the suspension.

11. A magnetic disk drive comprising:
a magnetic recording medium; and
a head arm assembly,
wherein the head arm assembly comprises:
a magnetic head slider including a thin film magnetic head which includes a magnetoresistive device according to claim 7 on a side of the magnetic head slider;
a suspension to which the magnetic head slider is attached at an end thereof; and
an arm supporting the other end of the suspension.

12. A thin film magnetic head, comprising:
a magnetoresistive device according to claim 6.

13. A head gimbal assembly, comprising:
a magnetic head slider including a thin film magnetic head which includes a magnetoresistive device according to claim 6 on a side of the magnetic head slider; and
a suspension to which the magnetic head slider is attached at an end thereof.

14. A head arm assembly, comprising:
a magnetic head slider including a thin film magnetic head which includes a magnetoresistive device according to claim 6 on a side of the magnetic head slider;
a suspension to which the magnetic head slider is attached at an end thereof; and
an arm supporting the other end of the suspension.

15. A magnetic disk drive comprising:
a magnetic recording medium; and
a head arm assembly,
wherein the head arm assembly comprises:
a magnetic head slider including a thin film magnetic head which includes a magnetoresistive device according to claim 6 on a side of the magnetic head slider;
a suspension to which the magnetic head slider is attached at an end thereof; and
an arm supporting the other end of the suspension.

16. A method of driving a magnetoresistive device, the magnetoresistive device comprising:
a fixing layer including an iridium-manganese alloy (IrMn);
a magnetization fixed layer including a first ferromagnetic layer having a magnetization direction fixed in a first direction by the fixing layer, an intermediate layer, and a second ferromagnetic layer having a magnetization direction fixed in a second direction opposite to the first direction by the fixing layer which are laminated in order from the fixing layer;
a non-magnetic layer disposed on a side of the magnetization fixed layer opposite to a side where the fixing layer is disposed; and
a magnetization free layer disposed on a side of the non-magnetic layer opposite to a side where the magnetization fixed layer is disposed and changing its magnetization direction according to an external magnetic field;
wherein in the case where the following conditional expression (1) is satisfied, a sense current flows in a direction where a current magnetic field toward the second direction is generated in the second ferromagnetic layer in an in-plane direction of the laminate of the magnetoresistive device, and in the case where the following conditional expression (2) is satisfied, a sense current flows in a direction where a current magnetic field toward the first direction is generated in the first ferromagnetic layer in an in-plane direction of the laminate of the magnetoresistive device:

$$0.6 \text{ mA} \leq (Ms2 \times T2 - Ms1 \times T1) \leq 1.5 \text{ mA} \tag{1}$$

$$-1.5 \text{ mA} \leq (Ms2 \times T2 - Ms1 \times T1) \leq 0.38 \text{ mA} \tag{2}$$

where Ms1 is the saturation magnetization of the first ferromagnetic layer; T1 is the thickness Of the first ferromagnetic layer; Ms2 is the saturation magnetization of the second ferromagnetic layer; and T2 is the thickness of the second ferromagnetic layer.

* * * * *